United States Patent
Richter et al.

(10) Patent No.: US 8,813,316 B2
(45) Date of Patent: Aug. 26, 2014

(54) SEAT BELT LATCH PLATE ASSEMBLY

(75) Inventors: Steven J. Richter, St. Clair Shores, MI (US); George J. Strnad, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 136 days.

(21) Appl. No.: 13/280,367

(22) Filed: Oct. 25, 2011

(65) Prior Publication Data

US 2013/0097827 A1   Apr. 25, 2013

(51) Int. Cl.
*B60R 22/00* (2006.01)
*B60R 22/18* (2006.01)

(52) U.S. Cl.
CPC ......... *B60R 22/18* (2013.01); *B60R 2022/1812* (2013.01)
USPC .................................. 24/170; 24/168; 24/171

(58) Field of Classification Search
USPC .......................... 24/136 K, 168, 170, 171, 174
See application file for complete search history.

(56) References Cited

U.S. PATENT DOCUMENTS

| | | | | |
|---|---|---|---|---|
| 3,941,419 A | * | 3/1976 | Blom | 297/475 |
| 4,614,007 A | * | 9/1986 | Else | 24/136 K |
| 4,893,874 A | * | 1/1990 | Childress et al. | 297/483 |
| 5,050,274 A | * | 9/1991 | Staniszewski et al. | 24/171 |
| 5,058,244 A | * | 10/1991 | Fernandez | 24/170 |
| 5,411,292 A | * | 5/1995 | Collins et al. | 280/806 |
| 5,806,148 A | * | 9/1998 | McFalls et al. | 24/168 |
| 7,325,280 B2 | * | 2/2008 | Ichida | 24/170 |
| 7,712,194 B2 | * | 5/2010 | Fyhr | 24/171 |
| 7,871,132 B2 | | 1/2011 | Rogers | |

OTHER PUBLICATIONS

Research Disclosure Database No. 540064, pulished Apr. 2009.

* cited by examiner

*Primary Examiner* — Robert J Sandy
*Assistant Examiner* — David Upchurch

(57) ABSTRACT

A seat belt system includes a belt having an upper end mounted adjacent the occupant shoulder and a lower end mounted adjacent the occupant lap. A latch plate assembly is carried by the belt for engagement with a buckle and includes a housing having a base wall with a tongue for latching engagement by the buckle and a pair of flanges extending at a lateral spacing greater than the width of the belt. A lock bar is pivotally mounted on the flanges. The lock bar has a clamping surface moving toward and away from the base wall upon pivoting of the lock bar to clamp and unclamp the belt against the base wall to prevent transference of the belt through the latch plate assembly. A detent mechanism between the lock bar and the housing locks the lock bar at a pivotal position clamping the belt against the housing.

14 Claims, 4 Drawing Sheets

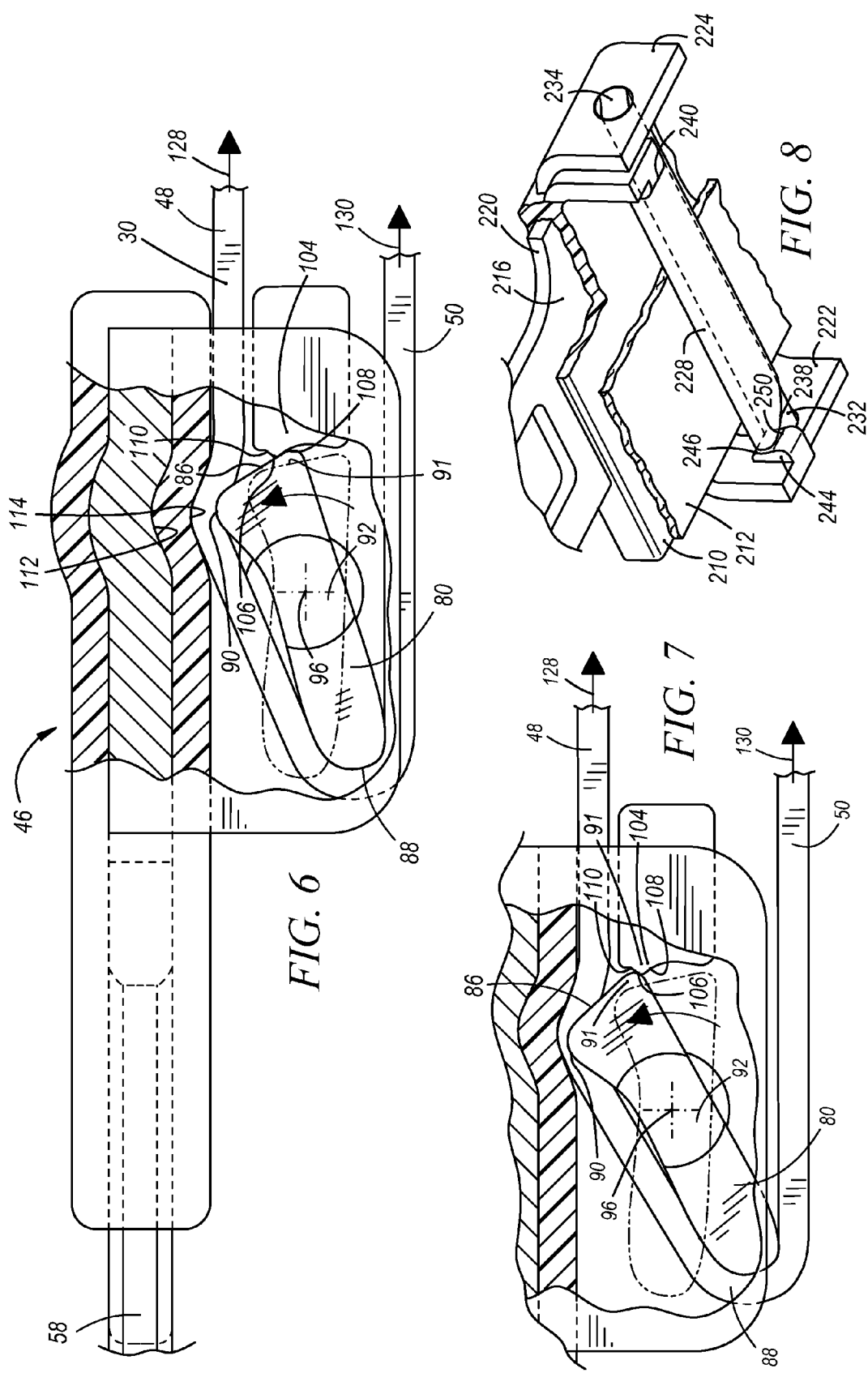

SEAT BELT LATCH PLATE ASSEMBLY

FIELD OF THE INVENTION

The present invention relates to a latch plate assembly that slides on the seat belt and clamps the seat belt against transference through the latch plate assembly when an occupant restraining load is imposed on the seat belt.

BACKGROUND OF THE INVENTION

It is known in vehicle seat belt systems to employ a continuous loop of belt having a latch plate assembly slidable along the belt to adjust the relative restraint lengths of the lap and shoulder belt portions. It is also known to provide a retractor mounting one end of the belt, preferably the shoulder belt end, to wind the continuous loop belt to a stored position extending generally vertically between an upper anchor mounting the shoulder belt end on the vehicle body and a lower anchor mounting the lap belt end on the vehicle body. The belt may be unwound from the retractor and extended across the occupant torso to engage the latch plate assembly in a buckle suitably mounted on a vehicle body inboard the occupant seat.

When the latch plate assembly is engaged in the buckle, and a load is imposed on the belt, the belt is clamped to prevent transference of the belt through the latch plate assembly.

It would be desirable to provide a new and improved latch plate assembly which would more effectively clamp the belt when sustained restraint of the seated occupant is needed, and, in particular, to permanently clamp the belt if the load on the seat belt exceeds a predetermined threshold. Accordingly, if the vehicle experiences an incident that requires sustained restraint of the occupant, the belt will remain locked within the latch plate assembly even if the occupant restraining load on the belt is momentarily relieved during the incident.

SUMMARY OF THE INVENTION

A seat belt system includes a belt having an upper end mounted adjacent the occupant shoulder and a lower end mounted adjacent the occupant lap. A latch plate assembly is carried by the belt for engagement with a buckle and includes a housing having a base wall with a tongue for latching engagement by the buckle and a pair of flanges extending at a lateral spacing greater than the width of the belt. A lock bar is pivotally mounted on the flanges. The lock bar has a clamping surface moving toward and away from the base wall upon pivoting of the lock bar to clamp and unclamp the belt against the base wall to prevent transference of the belt through the latch plate assembly. A detent mechanism is provided between the lock bar and the housing to lock the lock bar at a pivotal position clamping the belt against the housing.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 6 is a view similar to FIG. 4 but showing the latch plate in the buckled condition and an occupant restraint load causing the lock bar to clamp the seat belt against transference of the belt through the latch plate assembly.

FIG. 7 is a view similar to FIG. 6 but showing that a greater belt load imposed on the lock bar has permanently locked the lock bar to permanently clamp the seat belt against transference of the belt through the latch plate assembly.

FIG. 8 is a view similar to FIG. 3 of a second embodiment of the latch plate assembly showing the unbuckled position in which the latch plate assembly is free to slide along the belt.

DETAILED DESCRIPTION OF THE EXEMPLARY EMBODIMENTS

The following description of certain exemplary embodiments is merely exemplary in nature and is not intended to limit the invention, its application, or uses.

Figure 1:
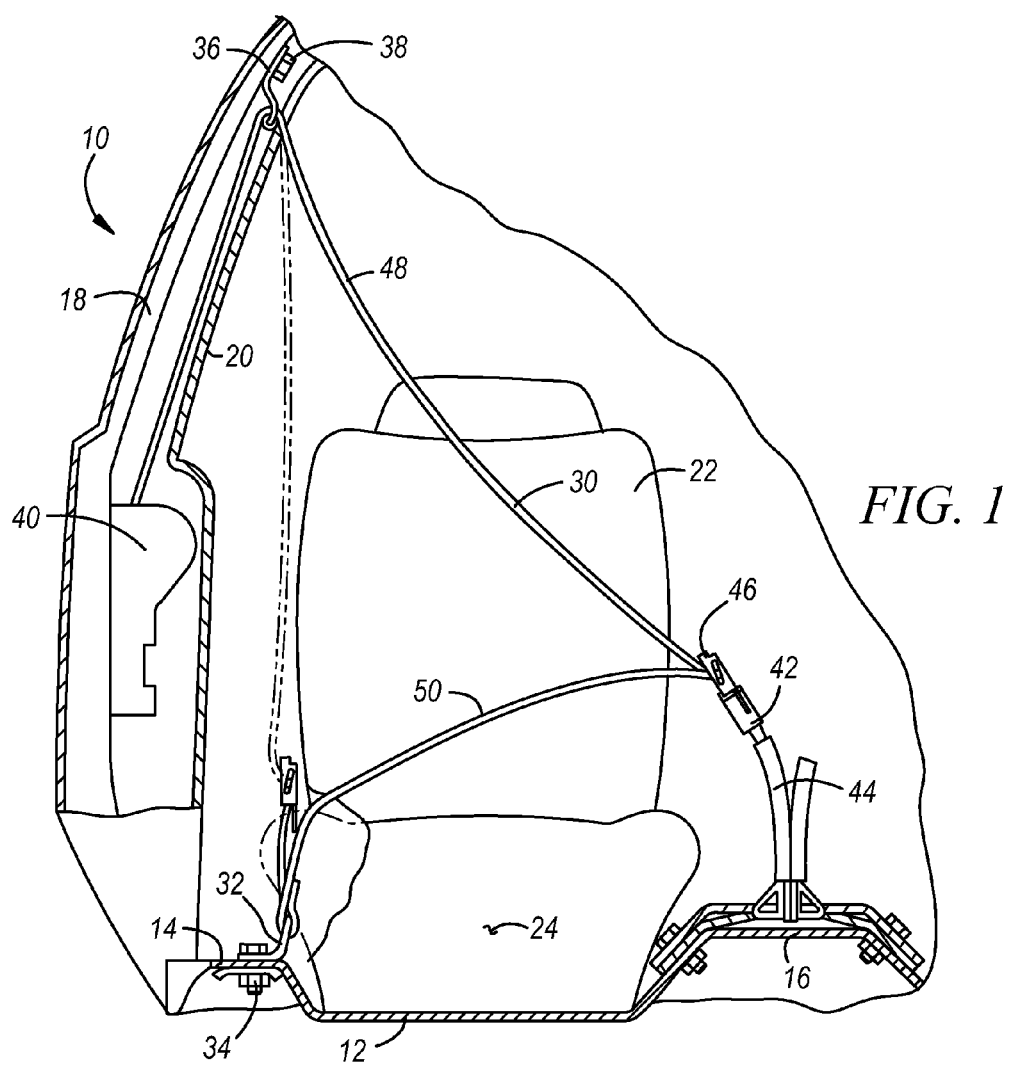
FIG. 1 is a section view taken through a vehicle body having an occupant restraint belt system including the latch plate assembly of this invention.

Referring to FIG. 1, a vehicle body, indicated by the numeral 10, includes a floor 12 having an outboard sill 14 and an inboard transmission tunnel 16. A pillar 18 extends vertically adjacent the rear of the seat outboard thereof and includes a trim panel 20 facing the passenger compartment of the vehicle body.

An occupant seat is mounted within the occupant compartment and includes a seat back 22 and a seat bottom 24. An occupant restraint system includes a continuous loop restraint belt 30 having a lower end attached to the sill 14 by an anchor plate 32 and a bolt assembly 34. The upper end of the continuous loop belt 30 passes through a guide loop 36 attached to the pillar 18 by a bolt 38. The continuous loop belt 30 extends downwardly to a shoulder belt retractor 40 which winds the continuous loop belt 30 to a phantom line indicated stored position extending generally vertically along the trim panel 20 between the anchor plate 32 and the guide loop 36.

A seat belt buckle 42 is mounted on the transmission tunnel 16 by a semi-rigid anchor strap 44. A latch plate assembly 46 is slidable along the continuous loop belt 30 and divides the continuous loop belt 30 into a lap belt portion 50 and a shoulder belt portion 48 when the latch plate assembly 46 is engaged within the buckle 42, as shown in FIG. 1.

Figure 2:
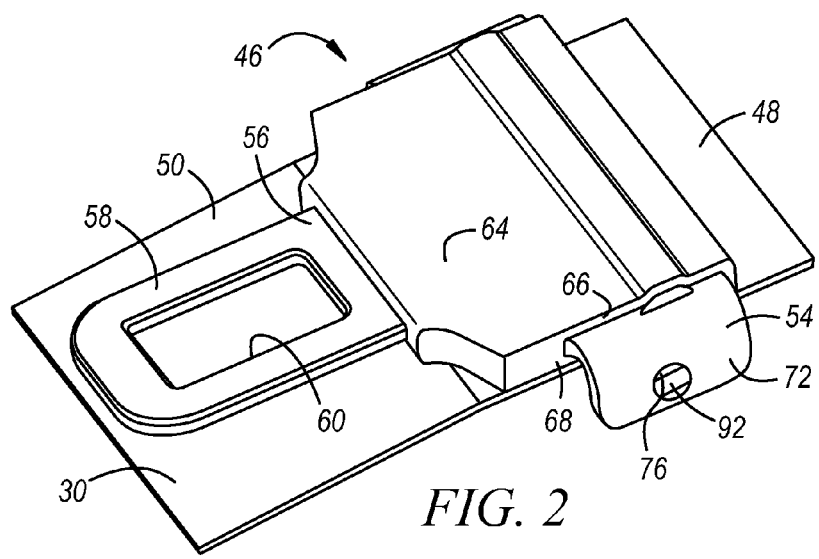
FIG. 2 is a perspective view of the latch plate assembly of this invention.
Figure 3:
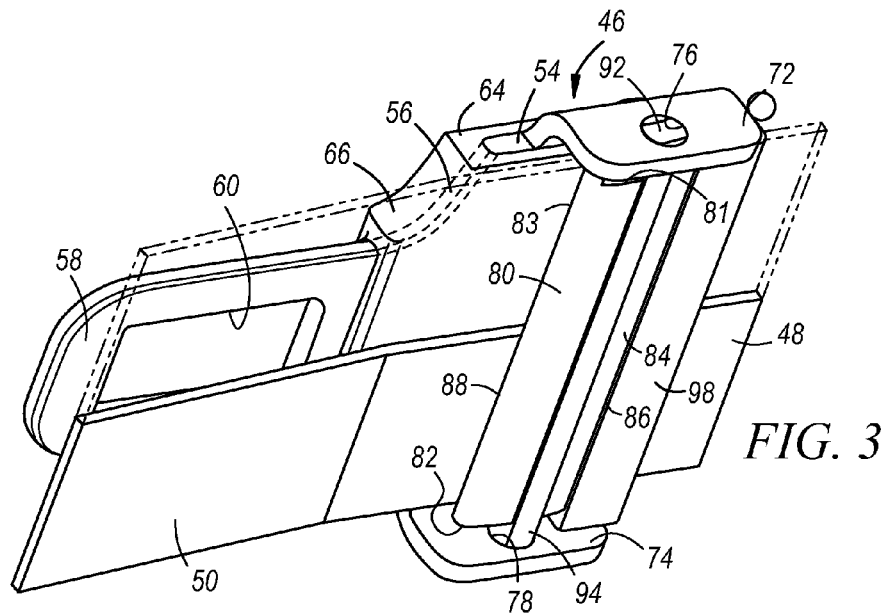
FIG. 3 is a perspective view showing the underside of the latch plate assembly.

Referring to FIGS. 2 and 3, the latch plate assembly 46 is comprised of a housing 54 that is stamped from sheet steel and includes a generally planar base wall 56 having a latch tongue 58 which is necked down to extend into the buckle 42 and has an aperture 60 for receiving the latch of the buckle 42. The planar base wall 56 is over-molded with plastic to form a cover 64 including an outer cover portion 66 that improves the aesthetics of the latch plate assembly 46, and an inner cover portion 68 that will be discussed further hereinafter.

Figure 4:
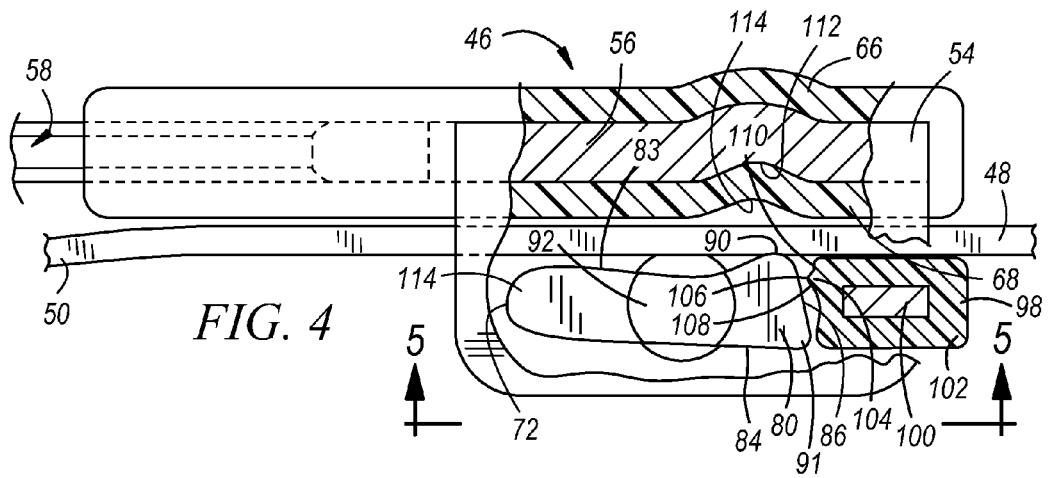
FIG. 4 is a side elevation view of the latch plate assembly showing the unbuckled position of the latch plate assembly in which the latch plate assembly is free to slide along the belt.
Figure 5:
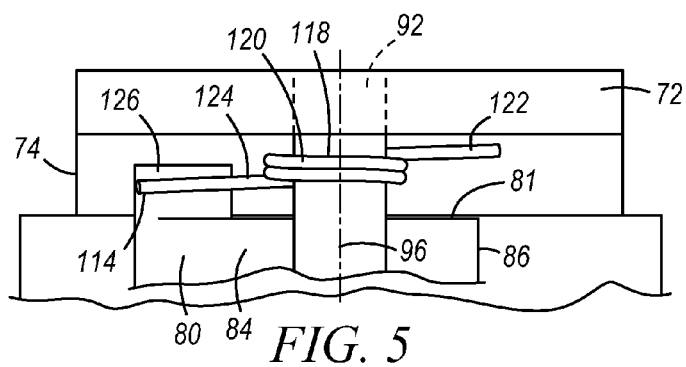
FIG. 5 is a view taken in the direction of arrows 5-5 of FIG. 4.

As seen in FIGS. 3, 4, and 5, the housing 54 also includes downturned flanges 72 and 74 that are downturned from the side edges of the housing 54 and are laterally spaced apart by a greater distance than the width of the belt 30. The downturned flanges 72 and 74 have circular openings 76 and 78 respectively provided therein.

A lock bar 80 is a rectangular bar of metal having ends 81 and 82, an upper surface 83, a lower surface 84, and side edges 86 and 88. A rounded clamping surface 90 is provided at the intersection of the side edge 86 and the upper surface 83. A rounded locking surface 91 is provided at the intersection of the lower surface 84 and the side edge 86. The ends 81 and 82 of the lock bar 80 have round pivot pins 92 and 94 integral therewith that extend respectively into the circular openings 76 and 78 so that the lock bar 80 is mounted for pivoting movement about axis 96 relative to the housing 54.

As best seen in FIG. 4, a detent bar 98 is provided adjacent the lock bar 80 and includes a metal base 100 having ends welded respectively to the downturned flanges 72 and 74. The detent bar 98 extends parallel with the lock bar 80. The metal base 100 is over-molded with a plastic cover 102 that defines a detent structure 104 including a detent projection 106 having a cam face 108 and a detent face 110 that will interact with the rounded locking surface 91 of the lock bar 80 to provide a detent mechanism, as will be described hereinafter.

Referring to FIG. 4, the planar base wall 56 of the housing 54 has a depression 112 formed therein and the inner cover portion 68 has a similar depression 114. These depressions extend laterally across the housing 54 between the downturned flanges 72 and 74, and align with the lock bar 80 to receive the rounded clamping surface 90 of the lock bar 80 when the lock bar 80 is pivoted relative the housing 54, as will be discussed further hereinafter.

As seen in FIG. 5, a spring 118 is provided for biasing the lock bar 80 to its normal unlocked position of FIG. 4. The spring 118 includes a coil 120 that encircles the pivot pin 92 of the lock bar 80. The coil 120 terminates in an anchor leaf 122 that engages the underside of the planar base wall 56 and a biasing leaf 124 that engages an abutment 126 formed on the end 81 of the lock bar 80. Accordingly, the spring 118 will position the lock bar 80 in the neutral unlocked condition of FIG. 4, where the rounded clamping surface 90 of the lock bar 80 is clear of clamping contact with the belt 30 so that the latch plate assembly 46 can slide freely up and down the belt 30.

Referring to FIG. 6, the latch plate assembly 46 is shown at its position in which the latch tongue 58 has been engaged in the buckle 42 so that the latch plate assembly 46 has been re-orientated relative the belt 30. Thus, FIG. 6 shows that the shoulder belt portion 48 and the lap belt portion 50 are lying generally parallel with one another.

During the onset of an occupant load against the belt 30, the lap belt load is applied in the direction of arrow 128. The belt 30 wrapping around the lock bar 80 will cause the lock bar 80 to rotate counterclockwise about axis 96, as viewed in FIG. 6, so that the belt 30 is clamped between the rounded clamping surface 90 of the lock bar 80 and the depression 114 of the inner cover portion 68 of the latch plate assembly 46. Thus, the belt 30 is clamped into the depression 114 so that the transference of belt 30 is prevented in either direction through the latch plate assembly 46. During restraint of the occupant, the lap belt load is applied in the direction of arrow 128, while at the same time the shoulder belt load will be applied to the shoulder belt in the direction of arrow 128. The force applied to the shoulder belt 48 in the direction of arrow 130 will oppose the lap belt load 128 and tend to pivot the lock bar 80 away from the locked position of FIG. 6. However, as seen in FIG. 6, the lock bar 80 is designed with the side edge 88 being a further distance from the center of rotation at the axis 96 than the side edge 86. The lock bar 80 acts as a lever creating a mechanical advantage so that the force applied to the lap belt 50 in the direction of arrow 128 has a greater effect than the force applied to the shoulder belt 48 in the direction of arrow 130. This mechanical advantage will work to maintain the lock bar 80 at its locked position of FIG. 6 against the bias of the spring 118 and against the bias of the shoulder belt load in the direction of arrow 130.

As seen in FIG. 6, the rounded locking surface 91 provided at the intersection of the lower surface 84 and the side edge 86 of the lock bar 80 is resting upon or near the cam face 108 of the detent bar 98 when the belt 30 is being clamped between the rounded clamping surface 90 of the lock bar 80 and the depression 114 of the inner cover portion 68 of the latch plate assembly 46.

Referring to FIG. 7, it is seen that a much higher load has been applied to the lap belt 50 in the direction of arrow 128 causing the lock bar 80 to rotate further clockwise from its position of FIG. 6 to the position of FIG. 7. Upon such further rotation, the rounded locking surface 91 of the lock bar 80 has cammed over the cam face 108 of the detent bar 98 and has come into contact with the detent face 110 of the detent bar 98. It will be understood that this passage of the rounded locking surface 91 over the detent projection 106 has been permitted by a flexure or yielding of the components of the latch plate assembly 46. For example, some of the flexure may occur at the pivots 92 and 94 of the lock bar 80, some of the flexure may occur by a flexure of the metal base 100 of the detent bar 98, and/or some of the flexure may occur within the nylon or other plastic material of the plastic cover 102 of the detent bar 98. The passage of the rounded locking surface 91 over the detent projection 106 results in a permanent lock-up of the latch plate assembly 46 as the spring 118 is not of sufficient force to return the lock bar 80 to its unlocked position of FIG. 4.

Thus, it is seen that the embodiment of FIGS. 1 through 7 has provided a latch plate assembly 46 that accomplishes a permanent locking of the seat belt 30 against transference through the latch plate assembly 46. Furthermore, the latch plate assembly 46 can be tuned to function at certain predetermined load thresholds. For example, the spring 118 can have a force of about 40 N so that a seat belt force greater than 40 N is required to pivot the lock bar 80 to the position of FIG. 6. In addition, for example, the latch plate assembly 46 can be tuned so that a force of greater than 1000 N is required to move the lock bar 80 to the position of FIG. 7, where the lock bar 80 is permanently locked by the engagement of the rounded locking surface 91 with the detent face 110 of detent projection 106. A force greater than 1000 N can be provided by an occupant load on the belt or can be provided by the triggering of a pyrotechnic tensioning device that will tighten the belt about the occupant in response to a sensed condition of vehicle deceleration.

The foregoing description of FIGS. 1 through 7 is intended to provide the details of one example for carrying out the invention, and a person of ordinary skill will recognize modifications that can be made. For example, the drawings herein show a molded plastic cover molded onto the stamped planar base wall 56. However, the invention can be practiced without such a molded plastic cover. The depression can be provided in the stamped steel planar base wall and the lock bar 80 will clamp the belt 30 into the depression in the stamped steel planar base wall. In addition, although the lock bar is shown as a one-piece molded metal component, the lock bar 80 can be a metal bar having an over-molded plastic cover.

FIGS. 8 through 11 show a second embodiment of the invention in which the detent mechanism for locking the lock bar at the clamping position is provided at the ends of the lock bar. FIG. 8 shows latch plate assembly 210 prior to being latched into the seat belt buckle so that belt 212 is free to slide through the latch plate assembly 210. The latch plate assembly 210 includes a stamped housing 216 having a generally planar base wall 220 with downturned flanges 222 and 224 extending from the side edges thereof. A lock bar 228 has pivot pins 232 and 234 projecting from end faces 238 and 240 of the lock bar 228 and seated within openings provided respectively in the downturned flanges 222 and 224 to mount the lock bar 228 for pivoting movement. A detent structure 244 is provided on the flange 222 and faces toward the end face 238 of the lock bar 228. The detent structure 244 includes a cam face 246 and a detent face 250. The detent structure 244 is provided of molded plastic that is over-molded onto the flange 222. A similar detent structure 254 is provided on the flange 224 and includes a cam face portion 256 and a detent face 260. The detent structures 244 and 254 will react with the end faces 238 and 240 of the lock bar 228 to provide a detent mechanism as will be described hereinafter.

Figure 9:
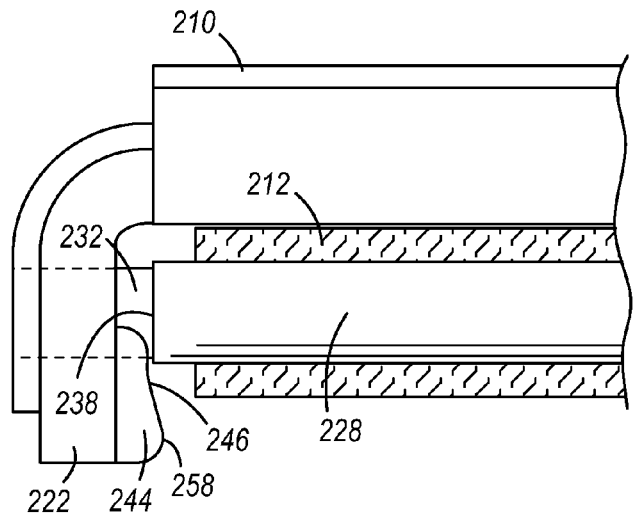
FIG. 9 shows the latch plate in the buckled condition in readiness for clamping the belt.

Referring to FIG. 9, the latch plate assembly 210 has been buckled in the buckle and reoriented so that the belt 212 is now wrapped around the lock bar 228. In FIG. 9, no load is imposed on the seat belt 212 so that the lock bar 228 is shown at its unclamped position and the end face 238 of the lock bar 228 is free from contact with the detent structure 244.

Figure 10:
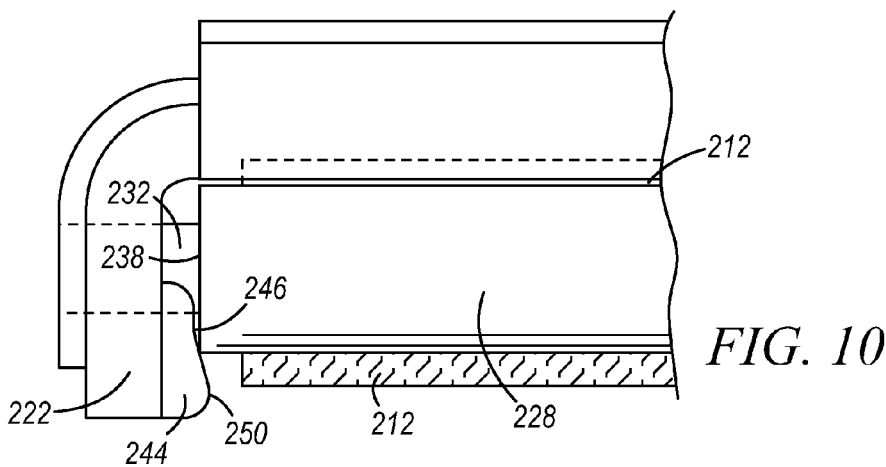
FIG. 10 shows the latch plate in the buckled condition and an occupant restraint load causing the lock bar to clamp the seat belt against transference of the belt through the latch plate assembly.

In FIG. 10, a load has been imposed on the seat belt 212 causing the lock bar 228 to have pivoted to its clamping position in which the belt 212 is now clamped against the planar base wall 220. In this position, the end face 238 has now moved into contact with the cam face 246 of the detent structure 244. When the load is removed from the seat belt, the lock bar 228 can return to its position of FIG. 9, in which the belt 212 is unclamped again and free to slide through the latch plate assembly 210.

Figure 11:
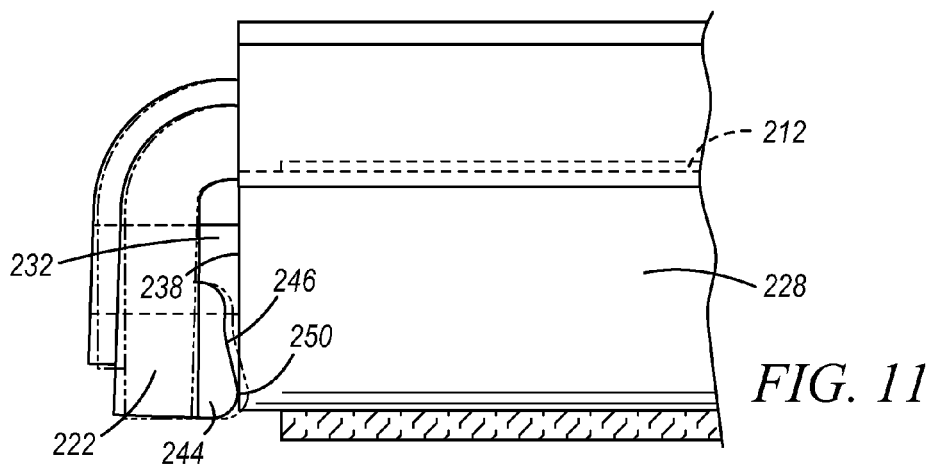
FIG. 11 shows that a greater belt load has been imposed on the lock bar and has locked the lock bar to permanently clamp the seat belt against transference of the belt through the latch plate assembly.

In FIG. 11, a substantial load is imposed on the belt 212, for example, by the activation of a pyrotechnic seat belt tensioning device. The load on the belt 212 has caused the lock bar 228 to pivot further beyond its clamping position of FIG. 10 so that the end face 238 of the lock bar 228 has progressed upwardly along the cam face portion 246 of the detent structure 244 and as permitted by an outward flexure movement of the downturned flanges 222 and 244. This outward flexure is shown in phantom lines in FIG. 11. Accordingly, as seen in the position of FIG. 11, the detent face 250 of the detent structure 244 is now pressing on the end face 238 of the lock bar 228 to frictionally clamp and hold the lock bar 228 at its clamped position of FIG. 11. Thus, once the lock bar 228 has reached the pivoted position of FIG. 11, the lock bar 228 will remain locked. This locked position and resultant clamping of the belt 212 will remain even if the load is removed from the belt 212. Thus, the seat belt 212 will continue to be clamped against transference through the latch plate assembly even if the seat belt load is momentarily removed from the seat belt 212. Accordingly, the belt 212 will remain locked in readiness for continued restraint of the vehicle occupant which may be particularly helpful in the event of a sustained event during which the occupant would benefit from continued restraint by the belt.

What is claimed is:

1. In a seat belt system with a continuous length of belt having an upper end mounted adjacent the occupant shoulder and a lower end mounted adjacent the occupant lap, and a latch plate assembly carried by the belt for engagement with a buckle; said latch plate assembly comprising:

a housing having a base wall with a tongue projecting from one end thereof for latching engagement by the buckle, and a pair of flanges extending from the base wall at a lateral spacing greater than the width of the belt;

a lock bar pivotally mounted on the flanges and having the belt wrapping around the lock bar so that a load imposed on the belt pivots the lock bar, the lock bar having a clamping surface moving toward and away from the base wall upon pivoting movement of the lock bar to clamp and unclamp the belt against the housing to prevent or permit transference of the belt through the latch plate assembly;

and a detent mechanism provided between the lock bar and the housing to permanently lock the lock bar at a pivotal position clamping the belt against the housing when the load imposed on the belt exceeds a predetermined threshold so that the belt is permanently clamped to prevent a subsequent transference of the belt through the latch plate assembly, the detent mechanism including a detent structure provided on the housing, the detent structure having a detent projection having a cam face and a detent face, the lock bar engaging and camming over the cam face to then engage the detent face to permanently lock the lock bar at the clamping position.

2. The latch plate assembly of claim 1 further comprising the housing having a cover over-molded on the base wall and the lock bar clamping the belt against the cover of the housing.

3. The latch plate assembly of claim 1 further comprising the detent mechanism including the housing having a detent bar extending between the flanges adjacent the lock bar and the detent mechanism acting between the lock bar and the detent bar.

4. The latch plate assembly of claim 3 further comprising the detent mechanism including a locking surface on the lock bar that engages with a detent face on the detent bar to permanently lock the lock bar at the clamping position.

5. The latch plate assembly of claim 1 further comprising the lock bar having pivot pins pivotally mounting the lock bar on the flanges, and the camming of the lock bar over the cam face of the detent bar being permitted by flexure of at least one of flexure of the pivot pins, flexure of the detent bar, or flexure of a plastic cover over-molded on the detent bar.

6. The latch plate assembly of claim 1 further comprising the detent mechanism including the lock bar having end faces and a detent structure provided on each of the flanges to engage the end faces and thereby permanently lock the lock bar at the clamping position.

7. The latch plate assembly of claim 6 further comprising the detent structure provided on each of the flanges including a cam face engaged by the ends of the lock bar to cause flexure of the flanges and further pivoting of the lock bar causes a detent face provided on each of the flanges to engage with the ends of the lock bar to permanently lock the lock bar at the clamping position.

8. In a seat belt system with a continuous length of belt having an upper end mounted adjacent the occupant shoulder and a lower end mounted adjacent the occupant lap, and a latch plate assembly carried by the belt for engagement with a buckle; said latch plate assembly comprising:

a housing having a base wall with a tongue projecting from one end thereof for latching engagement by the buckle and a pair of flanges extending from the base wall at a lateral spacing greater than the width of the belt;

a lock bar pivotally mounted on the flanges and having the belt wrapping around the lock bar so that a load imposed on the belt pivots the lock bar, the lock bar having a clamping surface moving toward and away from the base wall upon pivoting movement of the lock bar to clamp and unclamp the belt against the housing to permit or prevent transference of the belt through the latch plate assembly;

a detent bar extending between the flanges adjacent and parallel with the lock bar; and a detent mechanism provided between the lock bar and the detent bar to permanently lock the lock bar at a pivotal position clamping the belt against the housing when the load imposed on the belt exceeds a predetermined threshold so that the belt is permanently clamped to prevent a subsequent transference of the belt through the latch plate assembly, the detent mechanism including a detent structure provided on the detent bar and the detent structure having a detent projection having a cam face and a detent face, the lock bar having a locking surface engaging and camming over the cam surface to then engage the detent face to permanently lock the lock bar at the clamping position.

9. The latch plate assembly of claim 8 further comprising the housing having a cover over-molded on the base wall and the lock bar clamping the belt against the cover of the housing.

10. The latch plate assembly of claim 8 further comprising the detent bar having a metal base extending between the flanges and a plastic cover over-molded on the metal base.

11. The latch plate assembly of claim 8 further comprising the lock bar having pivot pins pivotally mounting the lock bar on the flanges, and the camming of the lock bar over the cam face of the detent bar being permitted by flexure of at least one of flexure of the pivot pins flexure of the detent bar, or flexure of a plastic cover over-molded on the detent bar.

12. In a seat belt system with a continuous length of belt having an upper end mounted adjacent the occupant shoulder and a lower end mounted adjacent the occupant lap, and a latch plate assembly carried by the belt for engagement with a buckle; said latch plate assembly comprising:

a housing having a base wall with a tongue projecting from one end thereof for latching engagement by the buckle, and a pair of flanges extending from the base wall at a lateral spacing greater than the width of the belt;

a lock bar pivotally mounted on the flanges and having the belt wrapping around the lock bar so that a load imposed on the belt pivots the lock bar, the lock bar having a clamping surface moving toward and away from the base wall upon pivoting movement of the lock bar to clamp and unclamp the belt against the housing to prevent or permit transference of the belt through the latch plate assembly;

and a detent mechanism provided between the lock bar and the flanges to permanently lock the lock bar at the clamping position when the load imposed on the belt exceeds a predetermined threshold so that the belt is permanently clamped to prevent a subsequent transference of the belt through the latch plate assembly, the detent mechanism including a detent structure provided on each of the flanges, the detent structure having a detent projection having a cam face and a detent face, the lock bar having end faces engaging and camming over the cam faces to then engage the detent faces to permanently lock the lock bar at the clamping position.

13. The latch plate assembly of claim 12 further comprising the detent structure provided on each of the flanges including the cam face engaged by the ends of the lock bar to causing flexure of the flanges so that further pivoting of the lock bar causes the detent face provided on each of the flanges to engage with the ends of the lock bar to permanently lock the lock bar at the clamping position.

14. The latch plate assembly of claim 12 further comprising the detent mechanism including the lock bar having end faces and a detent structure of molded plastic over-molded on each of the flanges.

\* \* \* \* \*